United States Patent Office 3,719,667
Patented Mar. 6, 1973

3,719,667
EPIMERIZATION OF 6-ACYLAMIDO AND 6-IMIDO PENICILLIN SULFOXIDE ESTERS
Gerald E. Gutowski, Indianapolis, Ind., assignor to Eli Lilly and Company, Indianapolis, Ind.
No Drawing. Filed Aug. 24, 1970, Ser. No. 66,594
Int. Cl. C07d 99/16
U.S. Cl. 260—239.1          11 Claims

ABSTRACT OF THE DISCLOSURE

This invention is addressed to a reversible process for the epimerization of 6α and 6β-epimers of 6-acylamido and 6-imido penicillin sulfoxide esters wherein either the α-epimer or the β-epimer is contacted with a N,O-bis-(trialkylsilyl)acetamide in the presence of an inert organic solvent to produce an equilibrium mixture of the α and β epimers.

---

This invention relates to a process for epimerizing penicillin sulfoxide esters, and more particularly to a process for epimerizing penicillin sulfoxide esters to the more biologically active epimer which can be used in the preparation of penicillin and cephalosporin antibiotics.

It is known that 6-acyl penicillin derivatives can take the form of either the alpha- or the beta-epimers as shown in the following formulae:

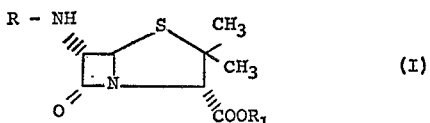

(I)

and

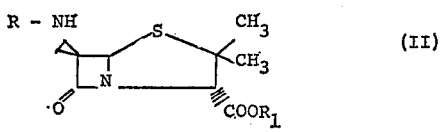

(II)

wherein R is an acyl group and $R_1$ is an organic group. Thus, the formula of (I) illustrates the general configuration of the $C_6$ alpha-epimer and Formula II represents the general configuration of the $C_6$ beta-epimer.

It is also known that the $C_6$ alpha-epimer has little or no biological activity as compared to the $C_6$ beta-epimer. Thus, it has become increasingly important to find a method for converting the epimer which is relatively biologically inactive to the biologically active epimer, particularly in light of the fact that Bose et al. [J.A.C.S. 90, 4506 (1968)] have reported that the penicillin nucleus can be synthesized from non-beta-lactam starting materials as illustrated by the following reaction which can be subjected to the steps of reduction and acylation in a known manner to form the corresponding $C_6$ alpha epimer of penicillin

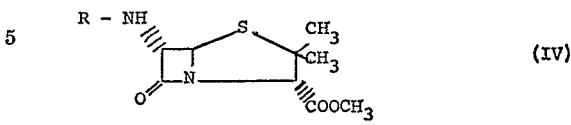

(IV)

Since the $C_6$ alpha-epimer is produced, the process of Bose et al. is of little practical use in the manufacture of penicillin and cephalosporin-type antibiotics without a means to convert the $C_6$ alpha-epimer to the corresponding $C_6$ beta-epimer.

Various methods for epimerizing $C_6$ penicillin derivatives have been reported in the literature, as represented by Johnson et al., Tetrahedron Letters, 1903 (1968); Wolfe et al., Chem. Comm., 242 (1968); Johnson et al., Tetrahedron Letters, 267 (1969); and Clayton et al., Chem. Comm., 129 (1969). However, such methods suffer from numerous disadvantages. For example, in the methods described by the foregoing, use must be made of a penicillin derivative containing a tertiary amide side change in the 6-position, thus restricting the scope of applicability. In addition, the reported processes are disadvantageous in that they make use of basic conditions which cleave beta-lactams.

Perhaps most importantly, the reported epimerization processes are not reversible. Thus, while such methods have been capable of converting the $C_6$ beta-epimer to the $C_6$ alpha-epimer, they have been incapable of converting the $C_6$ alpha-epimer to the more important, from the standpoint of biological activity, $C_6$ beta-epimer.

It is accordingly an object of the present invention to provide a new and improved process for epimerizing penicillin derivatives which overcomes the foregoing shortcomings of the prior art.

It is a more specific object of this invention to provide a new and improved process for epimerizing penicillin sulfoxide esters which is completely reversible to permit conversion of the $C_6$ alpha-epimer to the $C_6$ beta-epimer.

It is a further object of the invention to provide a new and improved process for the epimerization of 6-acyl and 6-imido penicillin sulfoxide esters in which the epimerization reaction is independent of the nature of the group in the 6 position and the ester group.

It has been found that 6-acyl and 6-imido penicillin sulfoxide esters can be epimerized by contacting either the $C_6$ alpha-epimer and/or the $C_6$ beta-epimer with certain silyl catalysts in the presence of an inert organic solvent for a time sufficient to produce an equilibrium mixture of the $C_6$ alpha- and beta-epimers.

In accordance with the practice of the present invention, it has been found that the epimerization reaction is truly an equilibrium reaction in that the equilibrium mixture can be reached using either the $C_6$ alpha-epimer or the $C_6$ beta-epimer. It has been found that regardless of

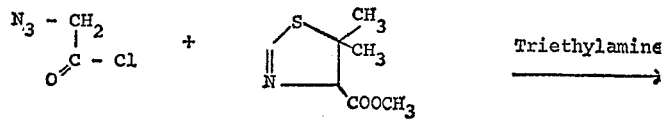

Triethylamine
$\longrightarrow$

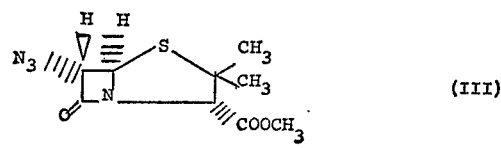

(III)

which of the two epimers is used as the starting material, the final product is the same, and generally contains mixtures of the $C_6$ epimers in a mole ratio of about 4 moles of the $C_6$ alpha-epimer per mole of the $C_6$ beta-epimer although this ratio may vary somewhat with various penicillin sulfoxide esters. Thus, the reaction can be expressed as

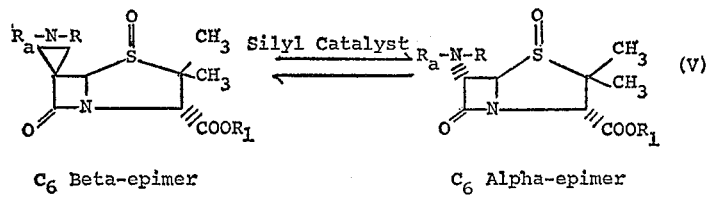

$C_6$ Beta-epimer     $C_6$ Alpha-epimer wherein $R_a$ is an acyl group, and R is selected from the group consisting of an acyl group, an alkyl group containing 1–6 carbon atoms (e.g., methyl, ethyl, propyl, etc.) and hydrogen, or $R_a$ and R, taken together, define a cyclic imido group, as represented by phthalimido, succinimido, etc.; and, $R_1$ is the residue of an organic ester protecting group.

As the starting material, use can be made of a wide variety of penicillin sulfoxide esters in the form of the $C_6$ alpha-epimer or the $C_6$ beta-epimer since, as described, the nature of the acyl group or the imido in the 6-position and the ester protecting group $R_1$ in the carboxyl group in the 3-position do not significantly affect the epimerization reaction. In contrast to epimerization methods heretofore known, the acyl group need not be such that the resulting amide group in the 6-position is a tertiary amide group.

Representative of the preferred compounds which can be epimerized by the process of this invention are the $C_6$ alpha-epimers and $C_6$ beta-epimers of 6-acylamido compounds having the formula

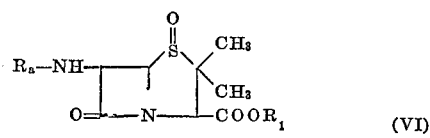

wherein $R_a$ is an acyl group and $R_1$ is the residue of an ester protecting group as described. A number of $R_a$ and $R_1$ substituents of the type described are now well-recognized in the penicillin art, and can accordingly be used in accordance with the practice of the invention.

Illustrative of suitable acyl groups which can be present in the starting materials treated in accordance with the practice of the invention include those acyl groups having the formula

wherein $n$ is zero or an integer from 1 to 6 and $R_2$ is an organic group such as an aryl group or a substituted aryl group containing 6–14 carbon atoms.

Preferred aryl groups are those derived from benzene or naphthalene

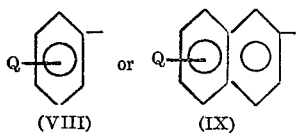

wherein Q is hydrogen or one or more substituents including, for example $C_1$ to $C_3$ alkyl (e.g., methyl, ethyl, propyl, isopropyl), $C_1$ to $C_3$ alkoxy (e.g., methoxy, ethoxy, propoxy, etc.), a cyano group, a nitro group, a hydroxy group, halogen (e.g., chlorine, fluorine, bromine and iodine), a trifluoromethyl group, a carboxy group, an amino group, a $C_1$ to $C_4$ carboxyalkyl group (e.g., carboxymethyl, carboxyethyl, carboxypropyl, etc.) or a $C_1$ to $C_4$ carboxamidoalkyl group [$H_2N$—C(O)-alkyl] (e.g., carboxamidomethyl, carboxamidoethyl, etc.).

Representative of the above acyl groups are benzoyl, phenylacetyl, beta - (phenyl)propionyl, naphthoyl, naphthylacetyl, gamma-phenylbutryryl, p-methylbenzoyl, 2,4-dimethylphenylacetyl, 5-methoxynaphthylacetyl, p-cyanophenylacetyl, 4 - nitronaphthoyl, 3 - nitrobenzoyl, 3,5-dicyanonaphthylacetyl, beta - (3 - nitrophenyl)propionyl, p - hydroxybenzoyl, 4 - hydroxyphenylacetyl, p - chlorophenylacetyl, m - bromobenzoyl, 3 - trifluoromethylphenylacetyl, O - carboxyphenylacetyl, m - carboxymethylphenylacetyl, m - carboxamidomethylphenylacetyl, beta(5 - carboxamidomethylnaphthyl)propionyl, aminobenzoyl, aminophenylacetyl as well as a number of others.

$R_2$ can also be a cycloalkyl group containing 4–8 carbon atoms, including cyclobutyl, cyclopentyl, cyclohexyl, cycloheptyl, etc. In addition $R_2$ can also be one of the foregoing cycloalkyl groups which is substituted by one or more of the Q substituents described above.

Illustrative of such acyl groups include cyclopentanoyl, cyclohexanoyl, 3 - methylcyclohexanoyl, cyclobutylcarbonyl, 2 - methoxycyclohexanoyl, 3 - chlorocyclohexylacetyl, cyclopentylacetyl, beta - cyclopentylpropionyl, 3-methoxycyclohexylacetyl, 2 - cyanocyclopentylacetyl, 3-nitrocyclohexanoyl, 3 - carboxycyclohexylacetyl, 3 - carboxamidomethylcyclohexylacetyl, etc.

$R_2$ can also be a heterocyclic group wherein the heteroatom is O, S, N or any combination thereof, including dioxanyl, 2-furyl, 3-furyl, imidazolyl, isoxazolyl, morphorinyl, oxazolyl, pyranyl, pyrazinyl, pyrazolyl, N-pyridyl, 2-pyridyl, 3-pyridyl, pyrimidyl, N-pyrryl, 2-pyrryl, 3-pyrryl, thiazolyl, 2-thienyl, 3-thienyl, 2-benzothienyl, 3-benzothienyl, triazinyl, triazolyl and the like; the partially and completely hydrogenated derivatives of the foregoing, such as tetrahydrofuryl, imidazolyinyl, imidazolidyl, piperidyl, tetrahydropyrimidyl, pyrrolidyl and the like; as well as all of the foregoing groups which are substituted by one or more of the Q groups described above, as represented by the picolyls, methylfuryls, methyl thienyls, nitrofuryl, cyanofuryl, nitrobenzothienyl, nitropyridyl, cyanopyridyl, methoxypyrimidyl, bromopyridyl, trifluoromethyl pyridyl as well as others of the type as described in Flynn U.S. Pat. No. 3,218,318.

Illustrative of acyl groups when $R_2$ is heterocyclic are dioxanylacetyl, 2 - furylcarbonyl, beta - pyrazinylpropionyl, 2 - pyridylacetyl, 3 - pyridylcarbonyl, 2 - thienylacetyl, 3 - benzothienylcarbonyl, piperidylacetyl, pyrrolidylcarbonyl, nitrobenzothienylacetyl, beta - (nitrofuryl)-propionyl, cryanopyridylcarbonyl, etc.

R can further be an acyl group having the general formula

wherein $R_3$ is either alkyl containing 1 to 8 carbon atoms (e.g., methyl, ethyl, isopropyl, n-butyl, tert-butyl, hexyl, isooctyl, etc.) or alkenyl containing 2 to 8 carbon atoms (e.g., vinyl, allyl, 2-butenyl, 3-hexenyl, etc.). $R_3$ can also be one of the foregoing alkyl or alkenyl groups which is substituted by one or more substituents including, for example, an amino group, a cyano group, a nitro group, a hydroxy group, halogen (e.g., chlorine, fluorine, bromine and iodine), a carboxy group or a carboxamide group

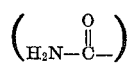

Illustrative of these acyl groups are acetyl, propionyl, acrylyl, crotoyl, 2-aminoacetyl, 3-chloropropionyl, 6-heptenoyl, adipoyl, 3-hydroxypropionoyl and 5-nitrohexanoyl.

Also included within the scope of the invention are those penicillin sulfoxide esters wherein $R_a$ is an acyl group having the formula

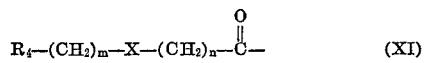
(XI)

wherein $n$ is as previously described, $m$ is zero or an integer form 1 to 5, X is O or S and $R_4$ is $R_2$ (i.e., aryl, cycloalkyl or heterocyclic) as described above including substituted derivatives thereof, or $R_3$ (i.e., $C_1$ to $C_8$ alkyl or $C_2$ to $C_8$ alkenyl) as described above, including substituted derivatives thereof.

Representative of the acyl groups defined by (XI) above include tert-butoxycarbonyl, tert-butoxyacetyl, ethoxyacetyl, tert-butylmercaptocarbonyl, tert-butylmercaptoacetyl, vinyloxyacetyl, allylmercaptoacetyl, 3-bromopropoxyacetyl, 3-hydroxypropylcarbonyl, 2-thienyloxyacetyl, piperidylmercaptoacetyl, 2-pyridyloxycarbonyl, phenoxyacetyl, naphthoxyacetyl, phenoxycarbonyl, aminophenoxyacetyl, beta-(phenoxy)-propionyl, cyclohexyloxyacetyl, chlorocyclopentyloxyacetyl, benzyloxyacetyl, phenylmercaptoacetyl, phenylbutoxyacetyl, phenylethylmercaptopropionyl and phenylmercaptoacetyl as well as a wide variety of others.

R can further be an acyl group having the general formula

(XII)

wherein Y is an amino group, a protected amino group, hydroxy, $C_1$ to $C_3$ alkoxy (e.g., methoxy, ethoxy, etc.) carboxyl or $C_1$ to $C_3$ alkanoyloxy (e.g., acetoxy, propionoxyl, etc.) and $R_5$ is one of the groups defined by $R_2$ above (i.e., aryl, heterocyclic and cycloalkyl as described in detail above).

Representative of the foregoing acyl groups are 2-phenyl-2-aminoacetyl, 2(p-methoxyphenyl)-2-aminoacetyl, 2-cyclohexyl-2-methoxy acetyl, 2-phenyl-2-acetoxyacetyl, 2-(2'-pyridyl)-2-hydroxyacetyl, 2-piperidyl-2-aminoacetyl, 2-(2-thienyl)-2-acetoxyacetyl as well as a variety of others.

In addition to the foregoing, R can be a number of other acyl groups, including, for example, phenyl-a,a-dimethylacetyl and Q substituted derivatives thereof and a number of others. Various other suitable R acyl groups are disclosed in the Behrens et al. U.S. Pats. Nos. 2,479,-295, 2,479,297, 2,562,407 and 2,623,876.

Similarly, the nature of the reaction is not significantly affected by the nature of the ester protecting group $R_1$. It is generally preferred that $R_1$ be an ester residue which is easily cleaved by known means, such as by dilute aqueous base, trifluoroacetic acid or by hydrogenation in the presence of a palladium or rhodium catalyst on a suitable carrier such as carbon, barium sulfate or alumina so that the penicillin is not degraded, since the ultimate product is generally used in the form of the acid.

Representative $R_1$ groups include $C_4$ to $C_6$ tertiary alkyl (e.g., tert-butyl, tert-pentyl, etc.), $C_5$ to $C_7$ tertiary alkenyl (e.g., tert-pentenyl, tert-hexenyl, etc.), $C_5$ to $C_7$ tertiary alkynyl (e.g., 1,1-dimethyl-2-phentynyl, etc.), benzyl, methoxybenzyl, nitrobenzyl, phenacyl, trichloroethyl, trimethylsilyl, benzhydryl, phthalimidomethyl; succinimidomethyl as well as a number of others apparent to those skilled in the art.

For convenience, the starting materials for use in the process of the present invention are named by the use of the "penam" nomenclature system, which has been described by Sheehan, Henery-Logan and Johnson in the Journal of the American Chemical Society (JACS), 75, 3292, footnotes 2 (1953). In accordance with this system, "penam" refers to the following saturated ring system.

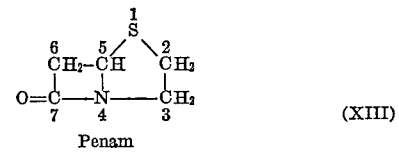
Penam
(XIII)

Thus, penicillin V (i.e., phenoxymethyl penicillin) has the structure

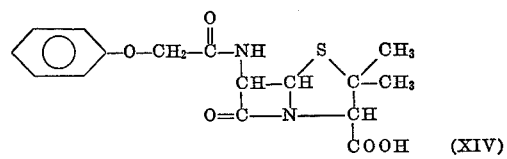
(XIV)

and can be named 6-phenoxyacetamido-2,2-dimethyl-penam-3-carboxylic acid.

Representative of the 6-acyl penicillin sulfoxide esters starting materials which can be used in accordance with the practice of the present invention are the $C_6$ alpha and $C_6$ beta epimers of the following compounds:

$\beta,\beta,\beta$-trichloroethyl 6-phenoxyacetamido-2,2-dimethyl-penam-1-oxide-3-carboxylate $\beta,\beta,\beta$-trichloroethyl 6-(2'-thienylacetamido)-2,2-dimethyl-penam-1-oxide-3-carboxylate p-methoxybenzyl 6-(2'-phenyl-2'-aminoacetamido)-2,2-dimethyl-penam-1-oxide-3-carboxylate p-nitrobenzyl 6-(allylmercaptomethylacetamido)-2,2-dimethyl-penam-1-oxide-3-carboxylate tert-butyl 6-phenylacetamido-2,2-dimethyl-penam-1-oxide-3-carboxylate p-nitrobenzyl 6-(gamma-chlorocrotylmercaptoacetamido)-2,2-dimethyl-penam-1-oxide-3-carboxylate tert-butyl 6-(5'-amino-5'-carboxyvaleramido)-2,2-dimethyl-penam-1-oxide-3-carboxylate tert-butyl 6-(n-butylmercaptoacetamido)-2,2-dimethyl-penam-1-oxide-3-carboxylate phthalimidomethyl 6-(2',6'-dimethoxybenzamido)-2,2-dimethyl-penam-1-oxide-3-carboxylate tert-butyl 6-(cyclohexylacetamido)-2,2-dimethyl-penam-1-oxide-3-carboxylate p-nitrobenzyl 6-(2'-benzothienylacetamido)-2,2-dimethyl-penam-1-oxide-3-carboxylate $\beta,\beta,\beta$-trichloroethyl 6-(3'-pyridylacetamido)-2,2-dimethyl-penam-1-oxide-3-carboxylate succinimidomethyl 6-aminoacetamido-2,2-dimethyl-penam-1-oxide-3-carboxylate tert-pentenyl 6-phenylmercaptoacetamido-2,2-dimethyl-penam-1-oxide-3-carboxylate benzyl 6-benzyloxyacetamido-2,2-dimethyl-penam-1-oxide-3-carboxylate benzhydryl 6-(4-methylphenylbutyrylamido)-2,2-dimethyl-penam-1-oxide-3-carboxylate tert-butyl 6-(N-phthalimido)-2,2-dimethyl-penam-3-carboxylate p-nitrobenzyl 6-(3-isopropylbenzylmercaptoacetamido)-2,2-dimethyl-penam-1-oxide-3-carboxylate trimethylsilyl 6-benzylmercaptopropionamido-2,2-dimethyl-penam-1-oxide-3-carboxylate tert-pentenyl 6-phenylethylmercaptropropionamido-2,2-dimethyl-penam-1-oxide-3-carboxylate $\beta,\beta,\beta$-trichloroethyl 6-phenylbutoxybutryrylamido-2,2-dimethyl-penam-1-oxide-3-carboxylate p-methoxybenzyl 6-(4-fluorophenoxyacetamido)-2,2-di-
methyl-penam-1-oxide-3-carboxylate
trimethylsilyl 6-(3-bromophenylacetamido)-2,2-dimethyl-
penam-1-oxide-3-carboxylate
p-nitrobenzyl 6-(phenyl-a,a-dimethylacetamido)-2,2-
dimethyl-penam-1-oxide-3-carboxylate
benzhydryl 6-(3-nitrophenylmercaptoacetamido)-2,2-
dimethyl-penam-1-oxide-3-carboxylate
succinimidomethyl 6-(4-cyanophenylpropionamido)-2,2-
dimethyl-penam-1-oxide-3-carboxylate
phthalimidomethyl 6-(3-trifluoromethylphenoxyacet-
amido)-2,2-dimethyl-penam-1-oxide-3-carboxylate The $C_6$ alpha and beta epimeric starting materials of the present invention can be prepared in any of a number of ways. For example, in accordance with the preferred practice of the invention wherein use is made of the $C_6$ alpha epimer as the starting material, the alpha epimer can be prepared by acylating a 6α-aminopenicillanic acid ester which has been prepared by the synthesis of Bose et al., supra, with a suitable acylating agent to provide the desired 6α-acylamido side chain. Then the resulting 6α-acylamido penicillin ester can be subjected to treatment with an oxidizing agent according to the prior art as described in U.S. Pat. 3,275,626 to Morin and Jackson to produce the corresponding sulfoxide.

A number of other silylating agents, including trimethylchloro silane, hexamethyldisilizane, N-trimethylsilyl acetamide, dimethylchlorosilane and trimethylsilylimidazole, have been found to be incapable of catalyzing the same reaction.

The amount of silyl acetamide employed is not critical and can be varied within fairly wide ranges. In general, best results are usually obtained when the N,O-bis(trialkylsilyl)-acetamide is employed in a ratio of 1 to 25 parts by weight of acetamide per part by weight of the penicillin sulfoxide ester contained in the reaction mixture.

As indicated above, the reaction is preferably carried out in the presence of an inert organic solvent. Methylene chloride is generally preferred although any inert organic solvent in which the penicillin sulfoxide ester is soluble can also be used in accordance with the practice of the invention. Illustrative of such solvents are ethylenedichloride, chloroform, dioxane, dimethylformamide, aliphatic ethers, such as diethylether, aliphatic ketones such as acetones or methyl ethyl ketone, aliphatic carboxylic acid esters such as ethyl acetate, isopropyl acetate or isoamyl acetate as well as a variety of other solvents.

Temperature is similarly not critical, and the epimerization reaction can conveniently be carried out at room

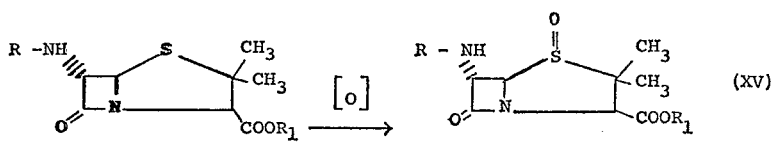

(XV)

which is the 6α-acylamido penicillin sulfoxide ester starting material for use in the process of this invention.

As described by Morin and Jackson in the aforementioned patent, the prior art describes a number of oxidizing agents for converting the penicillin ester to the corresponding penicillin sulfoxide ester, including meta-periodic acid, peracetic acid, hydrogen, peroxide, metachloroperbenzoic acid, etc.

The 6β-acylamido penicillin sulfoxide ester can be prepared in a similar manner using natural or 6β-amino penicillanic acid esters, which can be acylated to provide the desired 6β-acylamido penicillanic acid ester, which in turn can be oxidized to the corresponding sulfoxide by the method described above. Alternatively, use can be made of a natural or 6β-acylamido penicillin which can be esterified and oxidized, or oxidized and then esterified, as desired. The resulting 6β-acylamido penicillin sulfoxide ester can then be used in accordance with the practice of this invention.

As the silyl catalyst, use is made of a N,O-bis-(trialkylsilyl) acetamide having the general formula

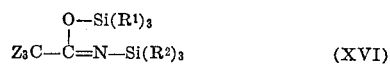

(XVI)

wherein $R^1$ and $R^2$ are each selected from the group consisting of alkyl containing 1–3 carbon atoms and Z is either hydrogen or halogen, and preferably fluorine. It is generally preferred to utilize N,O-bis(trimethylsilyl)acetamide and N,O-bis-(trimethylsilyl)-trifluoroacetamide, although use can be made of N,O-bis-(triethylsilyl)-acetamide, N,O-bis-(triethylsilyl)-trifluoroacetamide of N,O-bis-(tripropylsilyl)-acetamide.

temperature. However, higher or lower temperatures can also be used so long as the temperature is not sufficiently high to result in decomposition of the penicillin sulfoxide ester. In general, the reaction temperature within the range of 0° to 100° C., and preferably 10° to 50° C.

In carrying out the epimerization process of the present invention, either the $C_6$ alpha epimer or the $C_6$ beta-epimer of the penicillin sulfoxide ester starting material, or a mixture of both epimers so long as the composition of the mixture is different from the equilibrium mixture, is contacted with the N,O-bis-trialkylsilyl)acetamide in the presence of the inert organic solvent for a time sufficient for an equilibrium to be established. This time generally ranges from about 5 to 15 days, depending somewhat upon the nature of the penicillin sulfoxide ester. For many starting materials, a time of 7 to 10 days is usually sufficient.

The alpha- and beta-epimers can be separated from each other by way of a variety of techniques known to those skilled in the art, including fractional crystallization, column chromatography and the like. It is possible, and frequently desirable, to recycle the undesired epimer separated from various fractions to the reaction mixture to further increase the yield of the desired epimer.

As described above, since the process of the present invention results in a true equilibrium mixture, it is capable of converting the relatively inactive $C_6$ acylamido alpha-epimer to the more active $C_6$ acylamido beta-epimer. Thus, the process of the present invention provides the needed link in the route for preparing penicillin- and cephalosporin-type antibiotics by complete synthesis.

The steps of this complete synthesis can be illustrated by the following equations, starting with the synthesis of Bose et al., supra, to form the corresponding azide which can be reduced and acylated to form the corresponding 6α-acylamido penicillin ester

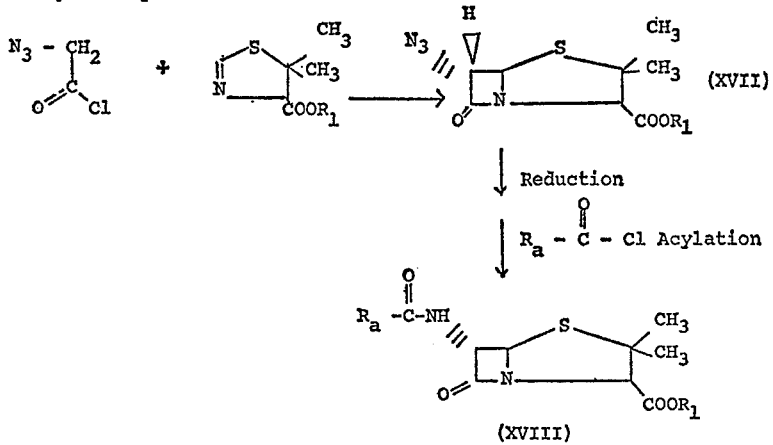

wherein $R_a$ is the residue of the 6α-acylamido group, which can be oxidized in accordance with the methods of the prior art described by Morin and Jackson to form the corresponding 6a-acylamido penicillin sulfoxide ester as follows

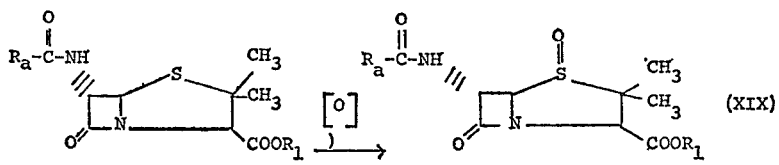

The product of (XIX) can then be epimerized in accordance with the concepts of the present invention to form the biologically active 6β-acylamido derivative

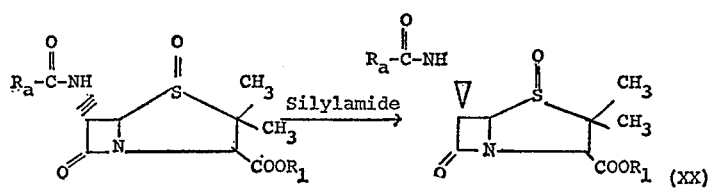

which, in turn, can be reduced in a known manner by means of, for example, the use of iron pentacarbonyl by the procedure described by Alper et al. in Tetrahedron Letters, 53 (1970) or various other reducing agents known to those skilled in the art, such as stannous chloride or sodium dithionite in the presence of an acetyl chloride activator, in accordance with the following equation:

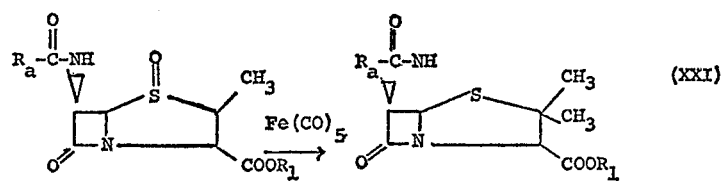

The product of (XXI), after cleavage to form the acid, is a 6β-acylamido penicillin. For example, when the acylamido group is phenoxyacetyl, the product of (XXI) in the form of the acid is penicillin V (i.e., 6β-phenoxyacetamido-2,2-dimethyl-penam - 3 - carboxylic acid), a well known antibiotic.

Alternatively, the 6β-acylamido penicillin sulfoxide esters prepared in accordance with the concepts of this invention as illustrated in (XX) above can be processed in accordance with penicillin ring expansion process described and claimed by Morin and Jackson in U.S. Pat. No. 3,275,626, or in accordance with the improvements in the Morin-Jackson process disclosed and claimed by Cooper in copending application, Ser. No. 636,629, Ser. No. 636,593 and Ser. No. 636,592, all filed May 8, 1967, in which descriptions are made of methods for converting penicillin sulfoxide esters to desacetoxycephalosporanic acid esters by thermal rearrangement in accordance with the following

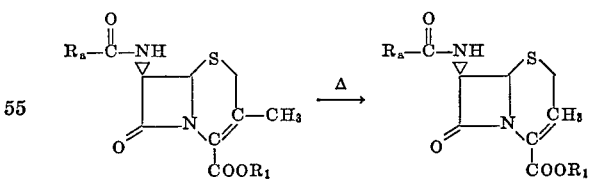

The foregoing compounds, in the form of the acid after cleavage of the $R_1$ group, constitute a valuable class of cephalosporin-type antibiotics described in U.S. Pat. No. 3,507,861.

It will be apparent from the foregoing that the process of the present invention makes possible the complete synthesis of penicillin and cephalosporin compounds which are biologically active. Heretofore, no means have been available to convert the inactive $C_6$ acylamido alpha epimer to the biologically active $C_6$ acylamido beta epimer.

Having described the basic concepts of the invention, reference is now made to the following examples which are provided by way of illustration, and not of limitation, of the practice of this invention.

EXAMPLE 1

Epimerization of β,β,β-trichloroethyl 6β(2'-phenoxyacetamido)-2,2-dimethyl-penam-1-oxide-3α-carboxylate A sample of 500 mg. of penicillin V sulfoxide β,β,β-trichloroethyl ester (β,β,β-trichloroethyl 6β-(2'-phenoxyacetamido)-2,2-dimethyl-penam - 1 - oxide-3-carboxylate) is dissolved in 10 ml. of dry methylene chloride. Thereafter, 1.25 ml. of N,O-bis-(trimethylsilyl)acetamide is added, and the resulting mixture is stirred in a closed vessel for 7 to 10 days at room temperature (~25° C).

Thin layer chromatography over silica gel reveals the presence of a less polar material, in addition to lesser amounts of the starting material. At this point, the solvent and N,O-bis-(trimethylsilyl)acetamide are removed under reduced pressure with the aid of a benzene-ethylacetate azeotrope.

The residue is then taken up in warm methanol. Upon cooling, about 205 mg. of a crystalline material is crystallized and identified as β,β,β-trichloroethyl 6α-(2'-phenoxyacetamido)-2,2-dimethyl-penam - 1 - oxide-3-carboxylate.

A second crop yields an additional 28 mg. of the same epimer. Intermediate fractions from the mother liquor co-crystallize as mixtures of the alpha and beta-epimers which can be separated by column chromatography or recycled. The final crop from the mother liquor yields the beta-epimer in a quantity of about 65 mg. It is estimated that the equilibrium mixture contains the 6α and 6β-epimers in a weight ratio of 4:1 of the alpha-epimer to the beta-epimer.

The identity of the alpha and beta epimers are confirmed by nmr and IR spectra.

EXAMPLE 2

Epimerization of β,β,β-trichloroethyl 6α-(2'-phenyloxyacetamido)-2,2-dimethyl-penam-1-oxide-3-carboxylate A sample of 500 mg. of the 6α-epimer prepared in the manner described in Example 1 is dissolved in about 10 ml. of methylene chloride, and to the resulting mixture is added about 1.15 ml. of N,O-bis-(trimethylsilyl)acetamide. The reaction mixture is stirred for about 9 to 10 days and then subjected to thin layer chromatography in the manner described in Example 1. It is found that the composition of the mixture is about the same as that obtained in Example 1.

After removal of the solvent and catalyst, the residue is treated with warm methanol in the manner described in Example 1. The 6α and 6β-epimers are separated from the mother liquor in a weight ratio of about 4:1 of the alpha-epimer to the beta-epimer.

Identification of the 6α and 6β-epimers is confirmed by IR and nmr spectra.

Examples 1 and 2 demonstrate that the epimerization reaction of the present invention represents a true chemical equilibrium since the final reaction mixture is obtained using either the $C_6$ alpha epimer or the $C_6$ beta epimer as the starting material.

EXAMPLE 3

Epimerization of p-methoxybenzyl 6β-(n-butylmercaptoacetamido-2,2-dimethyl-penam-1-oxide-3-carboxylate Penicillin BT is esterified by reaction with p-methoxybenzyl alcohol to form the corresponding ester which is then oxidized to the corresponding sulfoxide by metachloroperbenzoic acid.

The resulting sulfoxide (500 mg.) is then dissolved in methylene chloride, and N,O-bis-(trimethylsilyl)trifluoroacetamide is added to the solution which is stirred for about 8 days.

Analysis confirms that, at this time, the solution contains a mixture of 6β-(n-butylmercaptoacetamide)-2,2-dimethyl-penam-1-oxide-3-carboxylate and 6α-(n-butylmercaptoacetamido)-2,2-dimethyl-penam-1-oxide - 3 - carboxylate.

The epimers are separated by conventional methods.

EXAMPLE 4

Epimerization of p-methoxybenzyl 6α-(n-butylmercaptoacetamido) - 2,2 - dimethyl-penam - 1 - oxide-3-carboxylate To determine that the reaction of Example 3 is reversible, a sample of about 60 mg. of the 6α-epimer recovered in Example 3 is dissolved in methylene chloride, and N,O-bis-(trimethylsilyl)trifluoroacetamide is added to the resulting mixture.

After about 8 days of continuous stirring, the reaction mixture is heated under vacuum to remove the solvent and catalyst. Analysis confirms the presence of both the 6α- and 6β-epimers which can be seperated in a conventional manner.

EXAMPLE 5

Epimerization of tert-butyl 6α-(2'-furylacetamido)-2,2-dimethyl-penam-1-oxide-3-carboxylate A sample of 6α-amino-2,2'-dimethyl-penam-3-carboxylic acid prepared in the manner described by Bose et al., supra, is reacted with 2-furylacetyl chloride in a conventional manner to form the corresponding 6α-(2'-furylacetamido)-2,2-dimethyl-penam-3-carboxylic acid. This acid is then esterified with tert-butanol, and the resulting ester oxidized with peracetic acid to the corresponding sulfoxide.

500 mg. of the tert-butyl 6α-(2'-furylacetamido)-2,2-dimethyl-penam-1-oxide-3-carboxylate is dissolved in methylene chloride, and N,O-bis-(trimethylsilyl)acetamide (1.3 ml.) is added to the resulting solution. The resulting reaction mixture is stirred for 7 to 10 days, after which about 230 mg. of the 6β-epimer are separated by conventional methods. Unconverted 6α-epimer recovered in the separation of the 6β-epimer is recycled to the reaction mixture.

EXAMPLE 6

Epimerization of p-nitrobenzyl 6α-(thienylacetamido)-2,2-dimethyl-penam-1-oxide-3-carboxylate A sample of 6α-amino-2,2-dimethyl-penam-3-carboxylic acid prepared in the manner described in Example 5 is acylated with 2-thienylacetyl chloride (Example 4, U.S. Pat. No. 3,218,318) in a conventional manner, esterified by reaction with p-nitrobenzyl alcohol and oxidized to the corresponding sulfoxide in accordance with the procedure described in Example 5.

About 500 mg. of the product, p-nitrobenzyl 6α-(2'-thienylacetamido)-2,2-dimethyl-penam-1-oxide - 3 - carboxylate is dissolved in dichloroethane and about 1.5 ml. of N,O-bis-(triethylsilyl) acetamide is added to the resulting solution.

After about 8 to 9 days of stirring, the solvent and catalyst are removed in vacuo and the residue separated into the 6β-epimer and the 6α-epimer. Structure of the alpha and beta epimers is confirmed by IR and nmr spectra.

EXAMPLE 7

Epimerization of p-nitrobenzyl 6β-(thienylacetamido)-2,2-dimethyl-penam-1-oxide-3-carboxylate To determine that the epimerization reaction of Example 6 is reversible, a sample of about 200 mg. of the 6-beta epimer recovered in Example 6 is dissolved in ethylene dichloride and contacted with N,O-bis-(triethylsilyl)acetamide in the manner described in Example 6.

Analysis of the reaction mixture after about 9 days reveals that it contains a mixture of the 6-alpha and beta epimers which can be separated in a known manner.

EXAMPLE 8

Epimerization of $\beta,\beta,\beta$-trichloroethyl 6$\beta$-(2'-phenyl-2'-aminoacetamido) - 2,2 - dimethyl - penam-1-oxide-3-carboxylate $\beta,\beta,\beta$-trichloroethyl 6$\beta$-(2'-phenyl-2'-aminoacetamido)-2,2-dimethyl-penam-1-oxide-3-carboxylate (500 mg.) is dissolved in 10 ml. of methylene chloride, and 1.5 of N,O-bis-(trimethylsilyl) acetamide is added to the resulting solution.

After 8 to 9 days at room temperature, the solvent and catalyst are removed in vacuo. The residue is found to contain a mixture of the 6$\alpha$- and 6$\beta$-epimers which are separated by fractional crystallization in methanol.

EXAMPLE 9

Epimerization of $\beta,\beta,\beta$-trichloroethyl 6$\alpha$-(2'-phenyl-2'-aminoacetamido) - 2,2 - dimethyl - penam-1-oxide-3-carboxylate To determine that the epimerization reaction of Example 8 is reversible, 50 mg. of the $\beta,\beta,\beta$-trichloroethyl 6$\alpha$-(2'-phenyl-2'-aminoacetamido) - 2,2 - dimethyl-penam-1-oxide-3-carboxylate recovered in Example 8 is dissolved in methylene chloride, and N,O-bis-(trimethylsilyl)trifluoroacetamide is added (.25 ml.).

After about 10 days at room temperature, the reaction mixture is analyzed and found to contain a mixture of the 6$\alpha$- and 6$\beta$-epimers. The structure of the epimers is confirmed by IR and nmr spectra studies.

EXAMPLE 10

Epimerization of 1,1-dimethyl-2-propenyl-6$\alpha$-(phenylacetamido) - 2,2 - dimethyl - penam - 1 - oxide - 3 - carboxylate Using the procedure set forth in Example 1, 1,1-dimethyl - 2 - propenyl 6$\alpha$-(phenylacetamido)-2,2-dimethyl-penam-1-oxide-3-carboxylate is dissolved in methylene chloride and contacted with N,O-bis-(trimethylsilyl)trifluoroacetamide to produce an equilibrium mixture containing the 6$\alpha$- and 6$\beta$-epimers.

EXAMPLE 11

Epimerization of benzhydryl 6$\beta$-(phenylmercaptoacetamido)-2,2-dimethyl-penam-1-oxide-3-carboxylate Using the procedure of Example 1, benzhydryl 6$\beta$-(phenylmercaptoacetamido) - 2,2 - dimethyl - penam-1-oxide-3-carboxylate is dissolved in chloroform and epimerized in the presence of N,O-bis-(triethylsilyl)trifluoroacetamide to form an equilibrium mixture of the 6$\alpha$- and 6$\beta$-epimers.

To demonstrate that the epimerization reaction is reversible, the 6$\alpha$-epimer recovered from the above reaction is dissolved in chloroform and epimerized to an equilibrium mixture of the 6$\alpha$- and 6$\beta$-epimers using N,O-bis-(trimethylsilyl)acetamide.

EXAMPLE 12

Epimerization of p-nitrobenzyl 6$\alpha$-(3'-fluorobenzyloxyacetamido)-2,2-dimethyl-penam-1-oxide-3-carboxylate Using the procedure of Example 1, p-nitrobenzyl 6$\alpha$-(3' - fluorobenzyloxyacetamido) - 2,2 - dimethyl - penam-1-oxide-3-carboxylate is epimerized in the presence of N,O-bis-(trimethylsilyl)acetamide to form an equilibrium mixture to form a resulting mixture of 6$\alpha$- and 6$\beta$-epimers.

EXAMPLE 13

Epimerization of 1,1-dimethyl-2-pentynyl 6$\alpha$-(4'-cyanophenylmercaptoacetamido)-2,2-dimethyl - penam - 1-oxide-3-carboxylate Using the procedure of Example 1, 1,1-dimethyl-2-pentynyl 6$\alpha$ - (4'-cyanophenylmercaptoacetamido)-2,2-dimethyl-penam-1-oxide-3-carboxylate is epimerized in the presence of N,O-bis-(trimethylsilyl)acetamide to form an equilibrium mixture to form a resulting mixture of 6$\alpha$- and 6$\beta$-epimers.

EXAMPLE 14

Epimerization of trimethylsilyl 6$\alpha$-(3'-trifluoromethylphenoxyacetamido) - 2,2 - dimethyl-penam-1-oxide-3-carboxylate Using the procedure of Example 1, trimethylsilyl 6$\alpha$-3' - trifluoromethylphenoxyacetamido) - 2,2 - dimethyl-penam-1-oxide-3-carboxylate is epimerized in the presence of N-O-bis-(trimethylsilyl)acetamide to form an equilibrium mixture to form a resulting mixture of 6$\alpha$- and 6$\beta$-epimers.

EXAMPLE 15

Epimerization of phenacyl 6$\alpha$ - (phenylbutoxybutyrylamido) - 2,2 - dimethyl-penam-1-oxide-3-carboxylate oxylate Using the procedure of Example 1, phenacyl 6$\alpha$-(phenylbutoxybutyrylamido) - 2,2 - dimethyl - penam - 1 - oxide-3-carboxylate is epimerized in the presence of N,O-bis-(trimethylsilyl)acetamide to form an equilibrium mixture to form a resulting mixture of 6$\alpha$- and 6$\beta$-epimers.

EXAMPLE 16

Epimerization of benzyl 6$\alpha$-(phenyl-a,a-dimethylacetamido)-2,2-dimethyl-penam-1-oxide-3-carboxylate Using the procedure of Example 1, benzyl 6$\alpha$-(phenyl-a,a - dimethylacetamido) - 2,2 - dimethyl - penam - 1-oxide-3-carboxylate is epimerized in the presence of N,O-bis-(trimethylsilyl)acetamide to form an equilibrium mixture to form a resulting mixture of 6$\alpha$- and 6$\beta$-epimers.

EXAMPLE 17

Epimerization of tert-butyl 6$\beta$-(allylmercaptoacetamido)-2,2-dimethyl-penam-1-oxide-3-carboxylate Using the procedure of Example 1, tert-butyl 6$\beta$-(allylmercaptoacetamido) - 2,2 - dimethyl-penam-1-oxide-3-carboxylate is dissolved in methylene chloride in the presence of N,O-bis-(triethylsilyl)trifluoroacetamide to yield an equilibrium mixture of the 6$\alpha$- and 6$\beta$-epimers.

To demonstrate that the reaction is reversible, the 6$\alpha$-epimer recovered is dissolved in methylene chloride, and then epimerized in the presence of N,O-bis-(trimethylsilyl)acetamide to yield the equilibrium mixture of the 6$\alpha$- and 6$\beta$-epimers.

In view of the foregoing, it will be apparent that I have provided a new and improved method for epimerizing both the 6$\alpha$ and 6$\beta$-epimers of 6-acylamido 6-position penicillin sulfoxide esters in which the nature of the 6$\alpha$-acylamido group in the 6 position and the ester group in the 3-position have no significant effect on the conduct of the reaction. The process of the present invention provides a necessary link in the complete synthesis of penicillin and/or cephalosporin antibiotics.

It will be understood that various changes and modifications can be made in the details of procedure, starting material and use, without departing from the spirit of the invention, especially as defined in the following claims.

I claim:

1. A process for epimerizing penicillin derivatives comprising contacting a penicillin sulfoxide ester compound having the formula

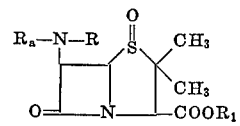

wherein $R_a$ is an acyl group, R is selected from a group consisting of an acyl group, hydrogen and $C_1$ to $C_6$ alkyl and $R_a$ and R, taken together, defining a cyclic imido group; $R_1$ is the residue of an organic ester protecting group which can be cleaved by dilute aqueous base, trifluoroacetic acid or by hydrogenation in the presence of a palladium or rhodium catalyst, with a silyl amide having the formula

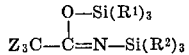

wherein Z is selected from the group consisting of hydrogen and halogen and $R^1$ and $R^2$ are each selected from the group consisting of alkyl containing 1–3 carbon atoms, in the presence of an inert organic solvent for a time sufficient to produce an equilibrium mixture of the alpha and beta epimers.

2. A process as defined in claim 1 wherein the silyl amide is present in a ratio of from 1–25 parts by weight of said compound.

3. A process as defined in claim 1 wherein said compound is contacted with the silyl amide for a period of 5–15 days.

4. A process as defined in claim 1 wherein said compound is the 6-alpha epimer.

5. A process as defined in claim 1 wherein said compound is contacted with the silyl amide at a temperature within the range of 0 to 100° C.

6. A process as defined in claim 1 wherein the penicillin sulfoxide ester has the formula

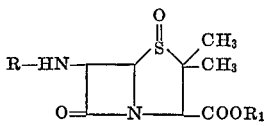

wherein R is an acyl group and $R_1$ is the ester protecting group.

7. A process as defined in claim 6 wherein R is a phenoxyacetyl group.

8. A process as defined in claim 6 wherein R is selected from the group consisting of (1) an acyl group having the formula

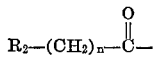

wherein $n$ is zero or an integer from 1 to 6 and $R_2$ is selected from the group consisting of monocyclic carbocylic and bicyclic carbocylic aryl containing 6–14 carbon atoms, cycloalkyl containing 4–8 carbon atoms and heterocyclic wherein the hetero atom is selected from the group consisting of O, S, N and combinations thereof, and substituted derivatives of (1) wherein the substituent is selected from the group consisting of $C_1$–$C_3$ alkyl, $C_1$–$C_3$ alkoxy, cyano, nitro, hydroxy, halogen, trifluoromethyl, carboxy, amino, $C_1$–$C_4$ carboxyalkyl and $C_1$–$C_4$ carboxamidoalkyl; (2) an acyl group having the formula

wherein $R_3$ is selected from the group consisting of $C_1$ to $C_8$ alkyl, $C_2$ to $C_8$ alkenyl and substituted derivatives of (2) wherein the substituent is selected from the group consisting of amino, cyano, nitro, hydroxy, halogen, carboxy and carboxamide; (3) an acyl group having the formula

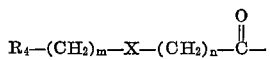

wherein $n$ has the meaning set forth above, $m$ is zero or an integer from 1 to 5, X is O or S, and $R_4$ is selected from the group consisting of $R_2$, $C_2$ to $C_8$ alkenyl and substituted $C_2$ to $C_8$ alkenyl derivatives wherein the substituent is selected from the group consisting of amino, cyano, nitro, hydroxy, halogen, carboxy and carboxamide; (4) an acyl group having the formula

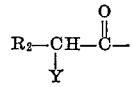

wherein $R_2$ has the meaning defined above and Y is selected from the group consisting of amino, protected amino, hydroxy, $C_1$ to $C_3$ alkoxy, carboxyl, and $C_1$ to $C_3$ alkanoyloxy; and, (15) phenyl-a,a-dimethylacetyl and substituted derivatives wherein the substituent is selected from the group consisting of $C_1$–$C_3$ alkyl, $C_1$–$C_3$ alkoxy, cyano, nitro, hydroxy, halogen, trifluoromethyl, carboxy, amino, $C_1$–$C_4$ carboxyalkyl and $C_1$–$C_4$ carboxamidoalkyl.

9. A process as defined in claim 1 wherein Z is fluorine.

10. A process as defined in claim 1 wherein the silylamide is seelcted from the group consisting of N,O-bis-(trimethylsilyl)acetamide and N,O-bis-(trimethylsilyl)trifluoroacetamide.

11. A process as defined in claim 6 wherein $R_1$ is selected from the group consisting of $C_4$–$C_6$ tertiary alkyl, $C_5$–$C_7$ tertiary alkenyl, $C_5$–$C_7$ tertiary alkynyl, benzyl, methoxybenzyl, nitrobenzyl, phenacyl, trichloroethyl, trimethylsilyl, benzhydroxy, phthalimidomethyl and succinimidomethyl.

References Cited

UNITED STATES PATENTS

| | | | |
|---|---|---|---|
| 3,594,366 | 7/1971 | Grant et al. | 260—239.1 |
| 3,594,367 | 7/1971 | Abe et al. | 260—239.1 |

NICHOLAS S. RIZZO, Primary Examiner

U.S. Cl. X.R.

424—271